(12) United States Patent
Hinault et al.

(10) Patent No.: US 7,923,387 B2
(45) Date of Patent: Apr. 12, 2011

(54) FLOOR COVERING WITH DOUBLE ROLLABLE REINFORCEMENT

(75) Inventors: Robert Hinault, Marcilly d'Azergues (FR); Alain Rivat, Les Sauvages (FR)

(73) Assignee: Gerflor, Villeurbanne (FR)

( * ) Notice: Subject to any disclaimer, the term of this patent is extended or adjusted under 35 U.S.C. 154(b) by 0 days.

(21) Appl. No.: 12/028,048

(22) Filed: Feb. 8, 2008

(65) Prior Publication Data

US 2008/0193697 A1 Aug. 14, 2008

(30) Foreign Application Priority Data

Feb. 9, 2007 (FR) ..................................... 07 53165

(51) Int. Cl.
*A21D 8/02* (2006.01)
(52) U.S. Cl. .............. 442/26; 442/20; 442/22; 442/370; 442/373
(58) Field of Classification Search ................ 428/318.4; 442/2, 30, 35, 38, 49, 50, 56, 57, 20, 22, 442/26
See application file for complete search history.

(56) References Cited

U.S. PATENT DOCUMENTS

| 4,698,258 A | 10/1987 | Harkins, Jr. |
| 5,182,162 A * | 1/1993 | Andrusko ..................... 428/219 |
| 2005/0090167 A1 * | 4/2005 | Hynicka et al. ................. 442/30 |

FOREIGN PATENT DOCUMENTS

| FR | 2640288 A1 | 6/1990 |
| FR | 2675178 A | 10/1992 |
| FR | 2681284 A1 | 9/1993 |
| WO | WO0210504 A | 2/2002 |

OTHER PUBLICATIONS

The French Search report for FR 0753165, dated Sep. 13, 2007.

* cited by examiner

*Primary Examiner* — Lynda Salvatore
(74) *Attorney, Agent, or Firm* — Heslin Rothenberg Farley & Mesiti P.C.; Victor A. Cardona, Esq.

(57) ABSTRACT

A floor covering having a double rollable reinforcement, of the type comprising on the front a calendered sheet of predefined thickness, a first reinforcement, a layer of foam and a second reinforcement, made from polyester material comprising a grid and a non-woven layer on the back, is characterized in that the first reinforcement comprises a single glass grid.

4 Claims, 1 Drawing Sheet

FLOOR COVERING WITH DOUBLE ROLLABLE REINFORCEMENT

CROSS REFERENCE TO RELATED APPLICATIONS

This application claims priority to French patent application number 0753165 filed on Feb. 9, 2007.

BACKGROUND ART

The invention relates to the technical field of floor coverings comprising a double stiffening and rollable reinforcement. These reinforcements are of the type made from a layer of non-woven polyester material.

Initially, with reference to FIG. 1, the covering (R1) is of the type comprising a sheet of controlled thickness—typically 0.5 to 3 mm—having a shore A hardness of between 60 and 90 prepared by known techniques of processing thermoplastic polymers: coating; calendering; extrusion. Preferably, the polymer used is plasticized PVC, but any other thermoplastic polymer can be used. On the back, the covering includes a reinforcement (2) consisting of a non-woven polyester bonded to a glass grid. Specifically, the non-woven material has a weight of 15 to 40 g/m² preferably 25 g/m² and the glass grid consists of glass yarns. These have a denier of 34 or 68 Tex distributed in a density varying between 1*1 and 5*5 yarns/cm in warp and weft with all possible asymmetric intermediate combinations. The covering includes a foam (3) for bonding to the floor. This foam is made from PVC, but any other thermoplastic polymer can be used. The foam thickness ranges from 1 to 10 mm and preferably from 3 to 8 mm.

The new regulation DTU 13.3 requires the elimination of any possibility of having, on the back of the material and joined to the foam, a non-woven back allowing the use of moisture resistant adhesives that are impossible to use with a back not lined with a non-woven material. This is explained by the fact that moisture resistant adhesives (PU 2 components or PU/Epoxy 2 components for example) have a very low adhesion to plasticized PVC. Furthermore, they have no "tack", making it impossible to lay the covering.

To meet this regulatory requirement, the solution was therefore to have on the back of the covering material a non-woven back capable of constituting a screen with the front part of the covering and of absorbing the entry of adhesive.

In the case of thin materials without a foam sub-layer, the problem is easily solved by the lamination of a non-woven structure on the back of the surface material.

On the contrary, for materials with a foam sub-layer, a first difficulty stems from the fact that the foam thickness prevents or hinders the bending of the material by the twin layer effect of the two reinforcements. With reference to FIG. 2 of the drawings, the covering (R2) answering to this definition comprises a calendered sheet (1) in one or more thicknesses, a structure of the type described for the covering (1), adding thereto a second reinforcement (4) of non-woven polyester material of the same type, with a grid and a polyester non-woven layer.

One problem raised by this type of covering resides in the fact that the double reinforcement forming a twin layer prevents the uniform rolling of the covering. FIG. 2A shows the covering (R2) of FIG. 2 in the rolling phase, that is with a curved shape, and, a situation of splitting and/or fracture of the non-woven material (2b) from these fibers with regard to the grid (2a) can be observed on the first reinforcement (2). FIG. 2B shows the final appearance of the unwound covering with the appearance of defects (2c) on the visible front side due to the torn non-woven material. This unattractive appearance is unacceptable to the customer. The pull exerted on the non-woven part of the first reinforcement during the rolling causes the fibers to tear.

This indicates a double drawback of difficulties in rolling the covering on itself, which inherently causes the fracture of one of the reinforcements and the loss of attractiveness of the product.

The Applicant's approach was therefore to seek to remedy these drawbacks.

In practice, and initially, tests were performed taking account of the variation in thickness of the various components of the covering, thereby trying to improve the constitution of the first reinforcement. The results did not prove satisfactory, and drawbacks subsisted to various degrees. The difficulty to be solved was to design a covering appropriate to the problems raised, but which is designed with a double reinforcement to meet the standard DTU 13.3.

The Applicant's approach was accordingly to examine the rolling conditions and the resulting physical effects.

It is therefore based on this problem and on this aforementioned approach that the Applicant considered modifying the structure of the first reinforcement of the covering, while preserving its principle in combination with the second reinforcement to put the solution of the invention into practice.

Brief Summary Of Invention

Thus, the floor covering according to the invention comprising on the front a calendered sheet of predefined thickness, a first reinforcement, a layer of foam and a second reinforcement, made from polyester material consisting of a grid and a non-woven layer on the back, is characterized in that the first reinforcement consists of a single grid excluding any addition of non-woven and similar polyester textile layer.

The solution provided as defined perfectly meets the initial objectives with regard to the prior art. Tests demonstrated the constitution of a covering with a double reinforcement and foam sub-layer, easily rollable and without jeopardizing the quality of its visual aesthetic appearance on its front side.

These features and others will clearly appear from the rest of the description.

BRIEF DESCRIPTION OF THE DRAWING FIGURES

To clarify the object of the invention illustrated in a non-limiting manner in the figures of the drawings.

DETAILED DESCRIPTION

To make the subject matter of the invention more concrete, it is now described in a non-limiting manner illustrated in the figures of the drawings.

Figure 3:
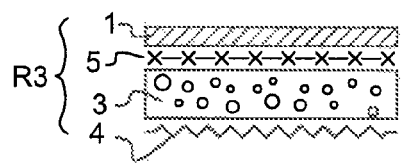
FIG. 3 shows a cross section of the covering (R3) of FIG. 3 in a rolling situation.
Figure 3A:
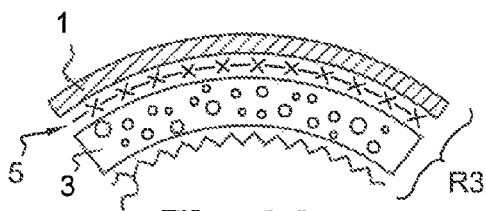
FIG. 3B shows the covering (R3) of FIG. 3A unrolled.
Figure 3B:
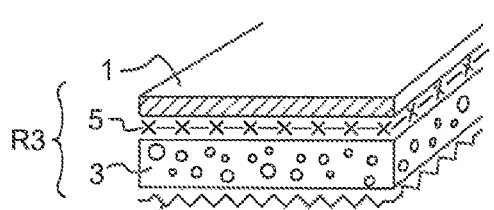

With reference to FIGS. 3, 3A, 3B, the covering (R3) of the type comprising a calendered sheet (1) of predefined thickness, a first reinforcement (5), a layer of foam (3), a second reinforcement (4) consisting of a grid and a non-woven textile layer of a polyester material, for example.

According to the invention, the first reinforcement (5) consists exclusively of a glass grid and does not include other components such as the non-woven textile layer.

Thus, the covering according to the invention is rollable despite the twin layer effect due to the two reinforcements. The glass grid (5) which stabilizes the covering has a very high elastic modulus compared to the second reinforcement including the back non-woven layer which conveys and enables the junction with the adhesive. In this way, the covering is rollable without difficulty and without jeopardizing its aesthetics.

Figure 1:
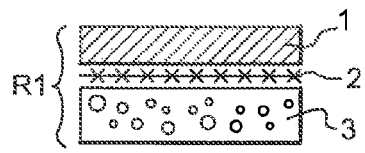
FIG. 1 shows a cross section of the structure of a floor covering (R1) according to the prior art.
Figure 4:
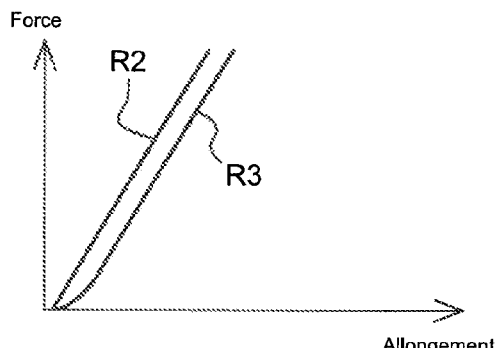
FIG. 4 shows a graph illustrating the elongation capacity with respect to the tensile force exerted on the first reinforcement constituted on the one hand according to FIG. 2, and on the other according to FIG. 3.
Figure 2:
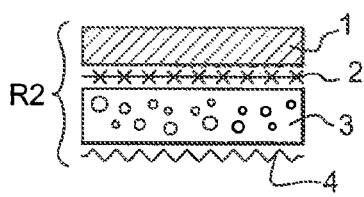
FIG. 2 shows a cross section of a floor covering (R1) with a double reinforcement according to the prior art.
Figure 2A:
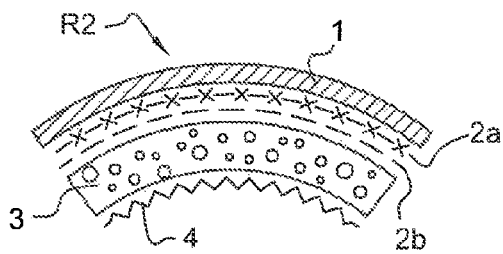
FIG. 2A shows the covering (R2) of FIG. 2 in a rolling situation with the effect of fracture of the first reinforcement.
Figure 2B:
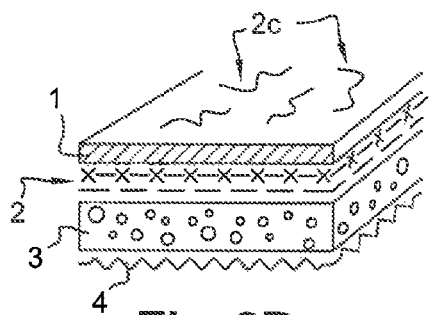
FIG. 2B shows the covering (R2) of FIG. 2A after unrolling with the appearance of an unattractive effect.

In practice, the solution provided by the invention is explained by the graph in FIG. 4, showing on the x-axis the elongation parameter and on the y-axis the tensile force. The graph shows the elongation of the first reinforcement (2) consisting of the glass grid, and a proportional and uniform elongation of the non-woven textile layer. This is due to the close bonding of the two components which engender a uniform elongation, whereas the stresses exerted on the non-woven textile layer cause the breakage of the fibers.

On the contrary, and according to the invention, the first reinforcement (5) consisting of the glass grid alone undergoes the elongation as a function of these parameters alone. The tensile force/elongation graph shows two zones with different slopes. The first zone corresponds to the stresses (tensile or compressive) exerted between the reinforcements, with sufficient elongations to avoid fracture.

A few details are provided below on the thicknesses of the components. The one- or more-ply calendered sheet may have a thickness of about 1 to 4 mm, which is non-limiting. The foam layer may have a thickness of 1 to 10 mm, preferably 3 to 8 mm. The first reinforcement (5) consists of a glass grid comprising glass yarns in denier 34 to 68 Tex distributed in a conventional warp weft geometry of up to 1*1 to 5*5 yarns per cm with all possible combinations between these limits—typically 3*3 34 Tex or 1.5*1.5 68 Tex. The second reinforcement (4) may or may not consist of a non-woven polyester of 60 to 120 g/m$^2$ of the "spun bonded" type.

The advantages of the invention clearly appear. The unexpected solution for solving the problem of eliminating one of the components of the first reinforcement provides immediate advantages, without jeopardizing the intrinsic qualities of the covering conferred by its components and without altering its aesthetics.

The invention claimed is:

1. Floor covering having a double rollable reinforcement, comprising a calendered sheet of predefined thickness on a front side, a first reinforcement, a layer of foam and a second reinforcement, made from polyester material comprising a grid and a non-woven layer on a back side, wherein the first reinforcement consists of a single glass grid;
   said glass grid structurally reinforcing the floor and comprising glass yarns with denier 34 to 68 Tex distributed in a warp weft geometry of up to 1:1 to 5:5 yarns per cm; and
   said non-woven layer comprises a non-woven polyester having a basis weight ranging from 60 to 120 g/m$^2$.

2. A floor covering having a double rollable reinforcement, comprising:
   a calendered sheet of predefined thickness on a front side of the covering;
   a first reinforcement contacting said calendered sheet and consisting of a single glass grid, said glass grid structurally reinforcing the covering;
   a layer of foam contacting said first reinforcement; and
   a second reinforcement on a back side of the covering, said second reinforcement contacting said layer of foam and consisting of a grid and a non-woven layer of polyester material.

3. The covering of claim 2 wherein the glass grid has a higher elastic modulus than said second reinforcement.

4. The covering of claim 2 wherein the grid of the second reinforcement comprises a glass grid.

* * * * *